Figure 1:
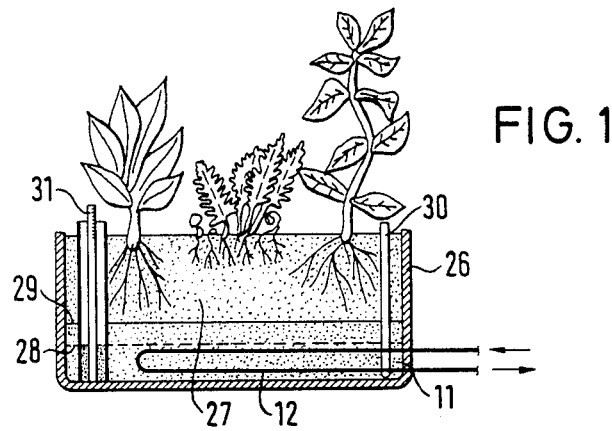

United States Patent [19]

Sick et al.

[11] Patent Number: 4,945,676
[45] Date of Patent: Aug. 7, 1990

[54] METHOD AND APPARATUS FOR SUPPLEMENTING THE FEED SOLUTION OF HYDROCULTURES WITH DESALINATED WATER

[75] Inventors: Erwin Sick, Icking; Franz Penningsfeld, Freising, both of Fed. Rep. of Germany

[73] Assignee: Erwin Sick GmbH Optik-Elektronik, Fed. Rep. of Germany

[21] Appl. No.: 249,797

[22] Filed: Sep. 27, 1988

[30] Foreign Application Priority Data

Oct. 2, 1987 [DE] Fed. Rep. of Germany ....... 3733440

[51] Int. Cl.$^5$ ............................................ A01G 31/02
[52] U.S. Cl. ........................................ 47/62; 47/1.01
[58] Field of Search ............... 47/48.5, 59, 60, 61, 47/62, 63, 64; 159/DIG. 27, DIG. 28; 202/185.2

[56] References Cited

U.S. PATENT DOCUMENTS

| | | | |
|---|---|---|---|
| 2,788,316 | 4/1957 | Bjorksten | 202/234 |
| 2,807,912 | 10/1957 | Bjorksten | 202/234 X |
| 3,461,606 | 8/1969 | Caloia | 202/83 X |
| 3,528,251 | 9/1970 | Falk | 47/48.5 X |
| 4,057,933 | 11/1977 | Enyeart | 47/79 |
| 4,182,357 | 1/1980 | Ornstein | 47/48.5 X |
| 4,572,706 | 2/1986 | Tsuruta | 47/48.5 X |
| 4,698,135 | 10/1987 | Raab | 159/DIG. 28 X |

FOREIGN PATENT DOCUMENTS

| | | |
|---|---|---|
| 3409510 | 9/1985 | Fed. Rep. of Germany . |
| 3610548 | 1/1987 | Fed. Rep. of Germany . |
| 1412971 | 5/1973 | United Kingdom . |

*Primary Examiner*—David A. Scherbel
*Assistant Examiner*—Jerrold D. Johnson
*Attorney, Agent, or Firm*—Townsend and Townsend

[57] ABSTRACT

A hydroculture has a feed solution tank 11 from which feed solution is supplied to the plant roots by capillary action or pump action. Feed tubes 12 of a hydrophobic microporous material which is water vapor permeable but not water permeable are laid in this feed solution tank 11, and salt water having a substantially elevated temperature relative to the feed solution is led through the feed tube 12. In this way the used-up feed solution is replaced by desalinated water.

10 Claims, 4 Drawing Sheets

METHOD AND APPARATUS FOR SUPPLEMENTING THE FEED SOLUTION OF HYDROCULTURES WITH DESALINATED WATER

The invention relates to a method of supplementing the feed solution of hydrocultures with desalinated water, and to an apparatus for supplementing the feed solution or water of hydrocultures, in which a feed solution tank is provided from which the feed solution is supplied by capillary forces or pump action to the plant roots.

A watering apparatus is already known (German Offenlegungsschrift No. 34 09 510) which is laid in the earth and in which a channel laid in the earth and carrying salt water is covered over by a water vapor or water permeable part. Water vapor condenses in this part and thus waters the ground with fresh water.

A watering apparatus of this kind is however not suitable for supplementing the feed solution of hydrocultures, since water could also penetrate from the liquid reservoir of the hydroculture into the interior of the channel carrying salt water or vice versa.

The object of the invention is thus to provide an apparatus of the initially named kind by means of which water containing salt, in particular sea water, can be used in simple and economical manner to supplement the feed solution, without the salt concentration in the feed solution increasing.

In order to satisfy this object the invention provides that tubes of hydrophobic microporous material which are permeable by water vapor but not by water are laid in the feed solution tank; and in that the salt water, in particular sea water, having a higher temperature relative to the feed solution is fed through the tubes.

Since the pipes laid in the feed solution tank are, in accordance with the invention, permeable by water vapor but not permeable by water it is possible for water vapor to pass from the inside to the outside and to condense in the surrounding colder feed solution however the reverse is not possible, namely that feed solution enters into the interior of the feed pipes. The feed pipes thus have a kind of valve action in that water is only present in their wall in the gaseous state, i.e. as water vapor, which moves in the direction of the colder feed solution and condenses there. Thus only desalinated sterilized water is added to the feed solution. Accordingly, the feed solution can be used for a long period of time without having to be changed whereby the water and feed solution consumption of the culture areas is greatly reduced and damage caused by salt enrichment in the feed solution is precluded.

The water containing salt, in particular sea water, is fed through the feed pipe at a temperature which is increased relative to the temperature of the feed solution surrounding the feed pipe by an amount such that a notable quantity of vapor passes from the inside to the outside through the wall of the feed tube and condenses in the surrounding feed solution.

Since the feed solution gradually warms up as a result of the heat of condensation which is continuously generated in the region of the feed tube a further embodiment of the invention provides that non-vapor-permeable cooling tubes are laid in the feed solution tank. In this way the temperature difference between the salt water located in the feed tubes and the feed solution necessary for the vaporization of the salt water is continuously maintained.

Since the feed solution heated by the heater of condensation at the feed tubes rises it is expedient when the feed tubes are arranged beneath the cooling tubes. In accordance with another embodiment the feed tubes and the cooling tubes can however also be arranged alongside one another in battery-like manner.

Automatic control of the liquid level can be achieved by providing a liquid level measuring device at the feed solution tank, with the liquid level measuring device acting via a liquid level control circuit on a feed valve in the feed tubes in such a way that the feed valve is normally open but is closed on exceeding a maximum liquid level.

Automatic temperature control can be achieved by providing a temperature sensor at the feed tank, with the temperature sensor acting via a temperature control circuit on a cooling valve in the cooling pipes in such a way that the cooling valve is normally open, but closes when the temperature falls below a minimum temperature.

The feed solution for the hydroculture is normally manufactured by the addition of a fertilizer or of a feed salt mixture to water. When the concentration of feed material in the feed solution falls below a specified value the feed substances which have been used up have to be replaced. This is best effected with a fertilizer admixing device which is switched-on via a control circuit when a concentration sensor arranged in the feed solution indicates values which are too low. This admixture takes place until the desired concentration is achieved. With a fertilizer admixing device of this kind water newly filled into the tank can also be prepared as a feed solution.

In the event that an excessive feed concentration in the feed solution should arise when the feed solution tank is full a further advantageous embodiment provides that a liquid discharge valve is also connected to the concentration sensor via a liquid discharge control circuit, with the valve responding when the permissible maximum concentration is exceeded and at the maximum feed solution level and remaining open until the liquid level has sunk by a predetermined amount.

A further advantageous apparatus for carrying out the method of the present invention is characterized in that chambers are partitioned off in or adjacent to containers containing a feed solution by means of areal membranes of hydrophobic microporous material, with the sea water or water with dissolved substances flowing through the chambers. It is of particular advantage with this arrangement when the chambers partitioned off by the membrane surfaces and carrying sea water or water with dissolved substances are arranged alternately with the cooling surfaces in battery-like manner. In this way it is relatively large areas arise with a relatively small space requirement. Thus it is possible to arrange the battery-like set of cooling surfaces and chambers carrying for example sea water in the relevant hydroculture trough itself rather than in the feed solution tank.

Further advantageous embodiments of the invention are set forth in the subordinate claims.

Figure 2:
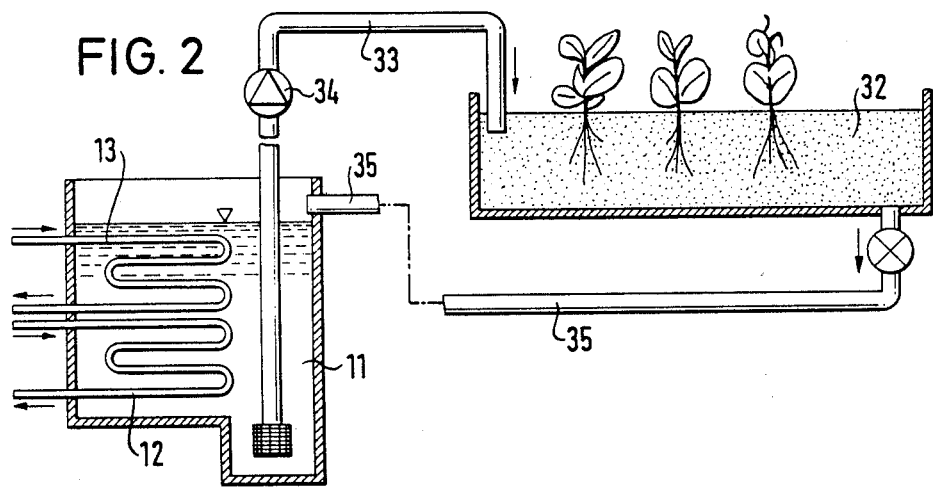
Figure 3:
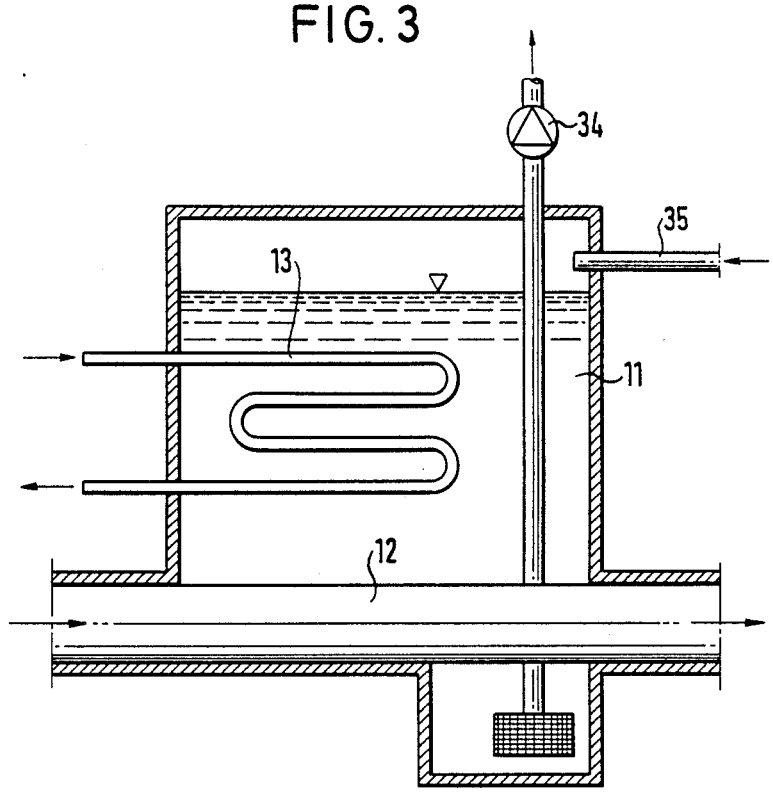
Figure 4:
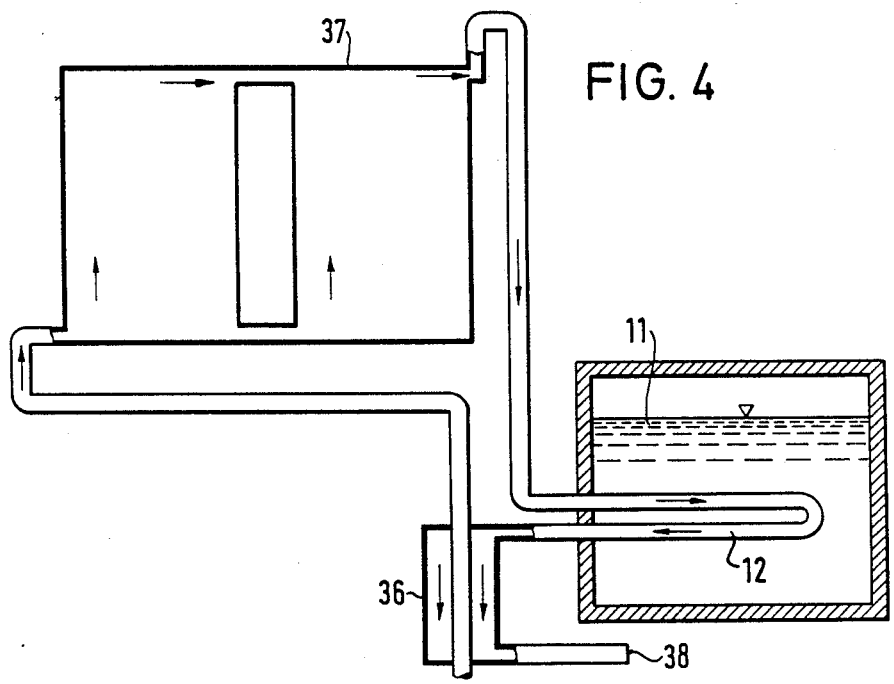
Figure 5:
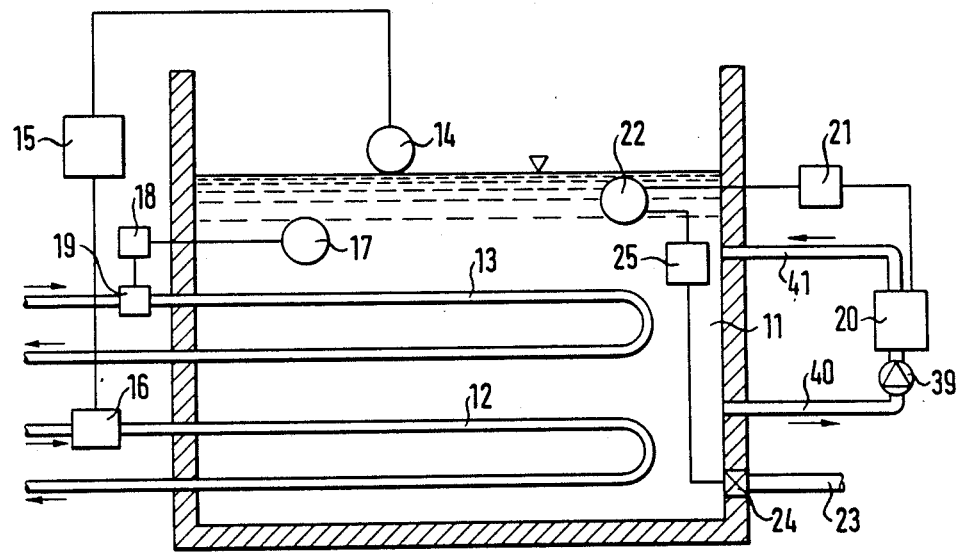
Figure 6:
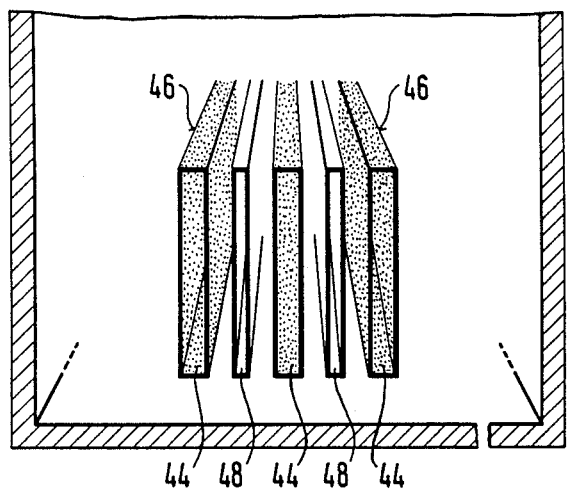

The invention will be described in the following by way of example and with reference to the drawings in which are shown:

FIG. 1 a schematic sectional view of a hydroculture equipped with an apparatus in accordance with the invention, wherein the infeed of the feed solution to the plant roots takes place by capillary forces, FIG. 2 a schematic view of a hydroculture in which the feed solution is supplied to the bed of plants via a pump and collects there for a short time, FIG. 3 a different embodiment of the apparatus for supplementing the feed solution in schematic view, FIG. 4 a schematic reproduction of a heating device for the salt water of an apparatus in accordance with the invention, FIG. 5 a schematic illustration of a feed solution tank of an apparatus in accordance with the invention together with the automatic control means arranged thereon, and FIG. 6 a schematic illustration of a hydroculture trough in which chambers partitioned off by means of areal membranes and carrying sea water are arranged in battery-like manner alternately with cooling surfaces.

As shown in FIG. 1 a hydroculture substrate 27 is accommodated in a plant containing vessel 26 with the level of the feed solution being able to fluctuate between the levels 28 and 29. The region beneath the levels 28, 29 represents the store of feed solution 11. A watering pipe and/or suction stub pipe 30 leads into this region from above. A liquid level measuring and indicating device 31 is provided at the opposite side.

A feed pipe 12 is laid in U-shaped manner in the feed solution store or feed solution tank 11 and consists of a hydrophobic microporous material as described in detail in German Offenlegungsschrift No. 36 10 548. The feed pipe can, as for example shown in FIG. 2, also be laid in snake-like manner. Salt water, in particular sea water flows through this feed tube 12 in the direction of the arrow. This water is so strongly heated relative to the feed solution in the feed solution tank 11 that a substantial temperature difference arises so that water vapor emerges through the walls of the feed tube 12 and condenses in the feed solution. In this way the liquid level can be continuously kept above the lower limit 28.

In the embodiment of FIG. 2 a bed of plants 32 is irrigated or watered via a supply tube 33 and a pump 34 from a separate feed solution tank 11. The feed solution is temporarily collected in the bed 32 and subsequently flows back via a return pipe 35 into the feed solution tank 11. This return pipe 35 opens into the feed solution tank 11 above the water level in this tank.

A feed tube 12 through which heated salt water flows and a cooling tube 13 are arranged above one another within the feed solution tank 11. The cooling tube 13 consists of a non-vapor-permeable material and a cooling fluid flows through it in the direction of the arrows.

In this embodiment the water vapor penetrates through the feed tube 12 into the feed solution and condenses there. The heat which arises is led away via the cooling tubes 13 which are located above the feed tube 12.

In the embodiment of FIG. 3 a flat hollow structure is laid at the base of the feed solution tank as the feed tube 12 in place of the tube snake provided in FIG. 2. This hollow structure 12 consists of water vapor permeable material only in the region within the feed solution tank 11.

In accordance with FIG. 4 fresh salt or sea water is supplied to a heat exchanger 37 formed as an areal or flat collector. Heat exchanger 37 is preferably a solar collector. The salt or sea water emerges in a strongly heated state from the heat exchanger 37 at the top. From there it passes into the feed tube 12 where the water vapor transfer to the feed solution and partial cooling takes place. The residual heat of the salt water is then transmitted in a heat exchanger 36 to newly supplied cool salt water before the more strongly concentrated and cool salt solution emerges at an outlet 38.

FIG. 5 shows how the apparatus of the invention can be fully automatically controlled.

A feed valve 16 is arranged at the input of the feed tube 12 and is acted on by a liquid level control circuit 15 which is connected to a liquid level measuring device 14. In this manner one ensures that the valve 16 is closed when the maximum liquid level in the liquid reservoir 11 is exceeded. The feed valve 16 is otherwise opened.

Furthermore, a temperature sensor 17 is arranged at the feed tank 11 and acts via a temperature control circuit 18 on a cooling valve 19 provided at the inlet to the cooling pipe 13. The cooling valve 19 is normally opened and is closed when the temperature at the temperature sensor 17 falls below a predetermined temperature.

Finally a feed substance admixing device 20 is provided at the feed solution tank 11. The feed substance admixing device 20 contains a pump 39 and can suck feed solution or water out of the feed solution tank 11 through a supply tube 40. This quantity of liquid is then enriched with feed substances and returned to the feed solution tank 11 again via an outlet tube 41.

The feed substance admixing device 20 is acted on via a feed substance admixture control circuit 21 which is connected to a concentration sensor 22 which in turn responds to the concentration of feed substances in the feed solution tank 11. When the concentration of feed substances is too low the feed substance admixture device 20 is switched-on until the predetermined desired concentration is reached. The concentration of feed substances can for example be determined by a conductivity measurement or by nitrate electrodes.

The concentration sensor 22 is moreover connected to a liquid discharge control circuit 25 which acts on a liquid discharge valve 24h to which a discharge pipe 23 is connected. If a concentration of feed substances is determined at the maximum liquid level which is too high then the valve 24 is opened for a certain time by the liquid discharge control circuit 25 so that excess concentrated feed solution can flow away and pure water arising at the feed tube 12 is then added after renewed closing of the valve 24 whereupon the feed substance concentration sinks in the necessary manner.

FIG. 6 shows a schematic representation of a hydroculture trough which contains a feed solution and in which chambers 44 are partitioned-off by means of membrane surfaces 46 of hydrophobic, microporous material, with the sea water or water with dissolved substances flowing through the chambers 44.

The chambers 44 which are partitioned-off by the membrane surfaces 46 and which for example carry sea water are alternately arranged with cooling surfaces 48 in battery-like manner. As a whole this results in a space saving insert with relatively large outer surfaces both for the chambers 44 carrying sea water and also for the cooling elements 48 which represent a hollow structure.

We claim:

1. Apparatus for supplementing the feed solution of hydrocultures with desalinated water comprising:
   a feed solution tank for storing a feed solution adapted to fluctuate between two levels of the tank;

pump means for supplying the feed solution by capillary force to the plant roots;

a hollow feed structure of hydrophobic microporous material having an inside and an outside and being disposed in the store of the feed solution tank;

said hollow feed structure separating salt water from the feed solution, the salt water having an elevated temperature relative to the store of feed solution and being feedable through the hollow feed structure such that water vapor only passes from the inside to the outside of said hollow feed structure and condenses in the surrounding colder store of feed solution, thereby heating feed solution portions disposed adjacent the hollow feed structure by the heat of condensation whereby the temperature of said feed solution portions rises.

2. Apparatus in accordance with claim 1 further comprising non-vapor-permeable cooling tubes disposed in said feed solution tank.

3. Apparatus in accordance with claim 2 wherein said hollow feed structures are disposed beneath said cooling tubes.

4. Apparatus in accordance with claim 2 wherein said hollow feed structure and said cooling tubes are disposed in battery-like manner alongside one another.

5. Apparatus in accordance with claim 1 wherein said hollow structure comprises a tube.

6. Apparatus in accordance with claim 1 wherein said hollow structure comprises a flat structure.

7. Apparatus in accordance with claim 1, characterized in that a liquid level measuring device (14) is provided at the feed tank (11) which acts on a feed valve in the feed tubes (12) via a liquid level control circuit (15) in such a way that the feed valve (16) is normally open, but is however closed on exceeding a maximum liquid level.

8. Apparatus in accordance with claim 2, characterized in that a temperature sensor (17) is provided at the feed solution tank (11) and acts via a temperature control circuit (18) on a cooling valve (19) in the cooling pipes (13) in such a way that the cooling valve (19) is normally open but is however closed when the temperature drops below a minimum temperature.

9. Apparatus in accordance with claim 1, characterized in that a feed substance admixing device (20) is provided at the feed solution tank (11) and is controlled via a feed substance addition control circuit (21) connected to a concentration sensor (22) disposed in the feed solution, in order to switch-on the feed substance admixing device (20) when the feed substance concentration falls below a predetermined value until the desired concentration is reached.

10. Apparatus in accordance with claim 8, characterized in that a liquid discharge valve (24) is connected to the concentration sensor (22) via a liquid discharge control circuit (25) and responds on exceeding a specified maximum concentration and a maximum feed solution level and then remains open until the liquid level has sunk by a predetermined amount.

* * * * *